United States Patent [19]
Van Iseghem, Jr.

[11] Patent Number: 6,000,165
[45] Date of Patent: Dec. 14, 1999

[54] FLOATING-AND-DIVING FISHING PLUG

[76] Inventor: Edmond J. Van Iseghem, Jr., 96 W. Sherwood Dr., Overland, Mo. 63114

[21] Appl. No.: 08/999,471

[22] Filed: Dec. 29, 1997

[51] Int. Cl.[6] .......................... A01K 85/00; A01K 85/12
[52] U.S. Cl. ........................................... 43/26.2; 43/42.32
[58] Field of Search ................... 43/26.2, 42.32, 43/42.31

[56]  References Cited

U.S. PATENT DOCUMENTS

| D. 345,003 | 3/1994 | Maleszewski, Jr. | D22/133 |
| 2,472,505 | 6/1949 | Yocam et al. | 43/42.01 |
| 2,534,639 | 12/1950 | Twist | 43/26.2 |
| 2,555,802 | 6/1951 | Martin | 43/26.2 |
| 2,736,123 | 2/1956 | Peterson | 43/42.09 |
| 2,891,343 | 6/1959 | Palermo | 43/26.2 |
| 3,505,753 | 4/1970 | Henderson | 43/26.2 |
| 3,791,064 | 2/1974 | Van Iseghem, Jr. | 43/26.2 |
| 4,765,084 | 8/1988 | Braden | 43/34 |
| 5,428,916 | 7/1995 | Dubriske | 43/26.2 |

Primary Examiner—Jack W. Lavinder
Attorney, Agent, or Firm—Grace J. Fishel

[57] ABSTRACT

A floating-and-diving fishing plug with a lip on the front end for pulling the plug under the water when it is reeled quickly. The plug additionally having a propeller and a central drive shaft for oscillating front and rear leg elements without a positive connection between the shaft and the legs. The legs are journaled in the plug with the end portions of the front legs angled towards the front of the body and oscillating below the journal axis of the front leg so that the front legs are not swept back and pinned by the water flowing over the plug.

3 Claims, 2 Drawing Sheets 6,000,165

1

FLOATING-AND-DIVING FISHING PLUG

BACKGROUND OF THE INVENTION

1. Field of the Invention

The present invention relates to a floating-and-diving fishing plug with a propeller and oscillating leg elements providing sound and motion, both on the surface and under water.

2. Brief Description of the Prior Art

Fishing plugs are made from bits of wood or plastic shaped like a minnow, frog, etc., and are all alike in that they are intended to look or act like something a fish might like to eat. A floating-and-diving plug floats when it is cast and has a lip that causes it to dive when it is retrieved, the depth at which it planes being determined by the angle and shape of the lip, the length of the angler's cast and the speed of the retrieve.

There are two ideal situations for floating-and-diving plugs. The first is when the angler is casting from a bank with a sloping shoreline where the plug can be reeled quickly as it passes over the drop-off and then slowly in the shallow area as it approaches the shore. The second spot is over a submerged weed bed in deep water. A floating-and-diving plug can be passed just over the weed tops when retrieved at the correct speed. It can be reeled very slowly when the weeds are nearest the surface and faster when they are more deeply submerged. If the angler sees a fishy-looking pocket, he can stop reeling and twitch the plug with short pulls as it slowly rises.

Floating-and-diving plugs are also useful for early morning and late-evening trolling, when the fish are feeding in water of moderate depth. Unlike straight-sinking plugs, floating-and-diving plugs are buoyant and will come to the surface when the angler slows down the boat or makes a short turn. This prevents the plug from getting snagged.

An ideal floating-and-diving plug would provide a satisfying solid ka-chunk when it is cast. It would disturb the surface when it is reeled slowly and it would make sounds and wiggle underwater as it is reeled quickly. The ka-chunk gives the angler confidence and the sound and motion attracts the fish.

A surface disturbing plug is described in U.S. Pat. No. 3,791,064 to Van Iseghem, Jr. with a propeller and oscillating leg elements built to splash and wiggle on top of the water. In a preferred embodiment, a central drive shaft causes the legs to oscillate without requiring a positive connection between the shaft and the legs. The patented plug is not designed to dive as water flowing over the body would bend the front legs backward, possibly jamming the propeller. The Van Iseghem, Jr. plug, however, is a good candidate for modification as described herein because it provides good surface action.

BRIEF SUMMARY OF THE INVENTION

In view of the above, it is an object of the present invention to provide a floating-and-diving fishing plug with oscillating legs that are animated without a positive connection between the shaft and the legs. It is another object to provide a floating-and-diving plug with oscillating legs as described above that are not jammed when the plug dives. Other objects and features of the invention will be in part apparent and in part pointed out hereinafter.

In accordance with the invention, a buoyant fishing plug as described in U.S. Pat. No. 3,791,064 is modified by the addition of a lip to the forward end of the plug so that it is caused to dive when it is reeled quickly. To avoid sweeping the front legs backward, possibly jamming the propeller, the front legs are formed so that they do not oscillate above the journal axis of the legs. Preferably, the front and rear legs are also shortened to minimize water resistance.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which.

DETAILED DESCRIPTION OF THE INVENTION

Figure 1:
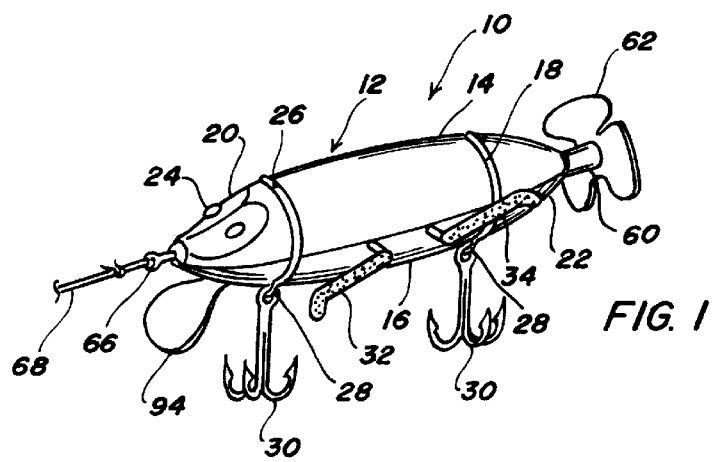
FIG. 1 is a perspective view of a floating-and-diving plug in accordance with the present invention.
Figure 2:
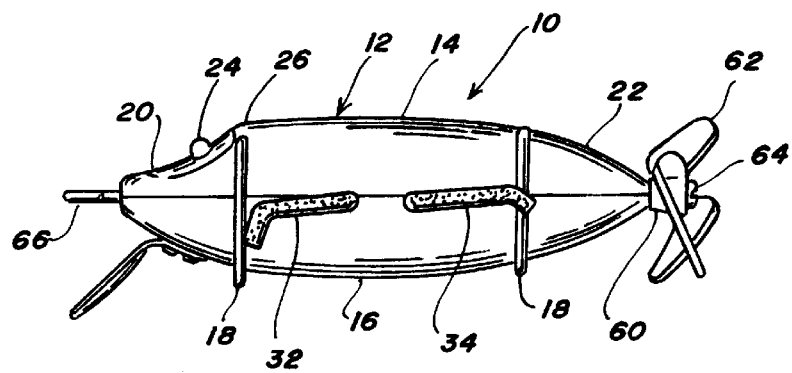
FIG. 2 is a side view of the plug, with end portions of front and rear legs shown in one extreme position.
Figure 3:
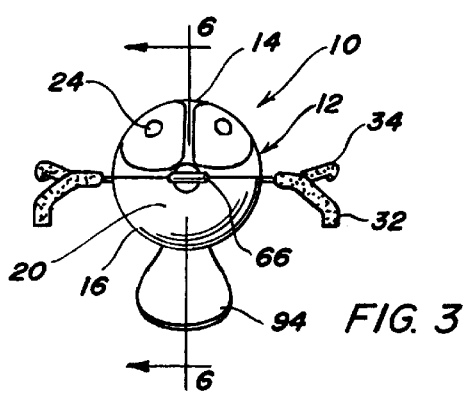
FIG. 3 is a front view of the plug with the legs in the position shown in FIG. 2.
Figure 5:
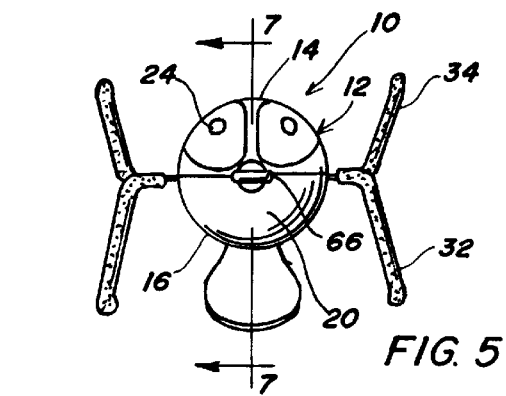
FIG. 5 is a front view of the plug with the legs in the position shown in FIG. 4.
Figure 4:
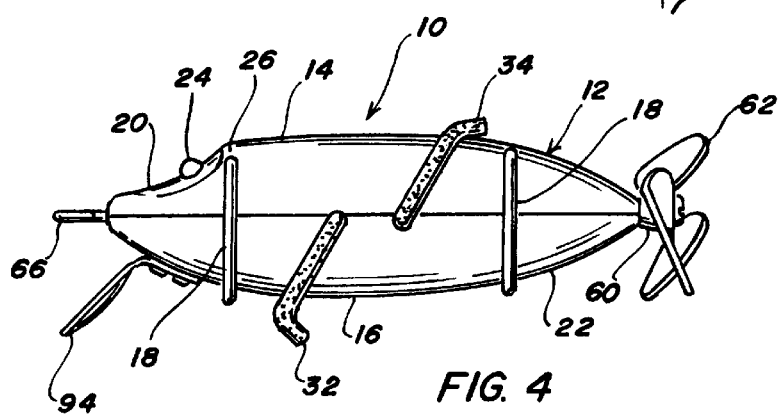
FIG. 4 is a side view of the plug, with the end positions of the front and rear legs shown in a second extreme position.
Figure 6:
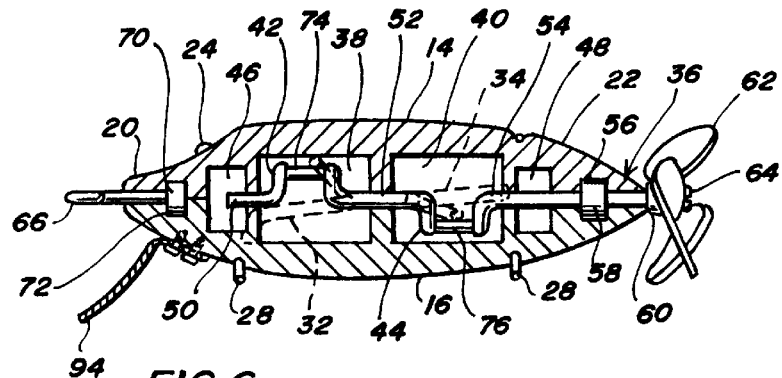
FIG. 6 is a side view in cross section of the plug taken along line 6—6 in FIG. 3.
Figure 7:
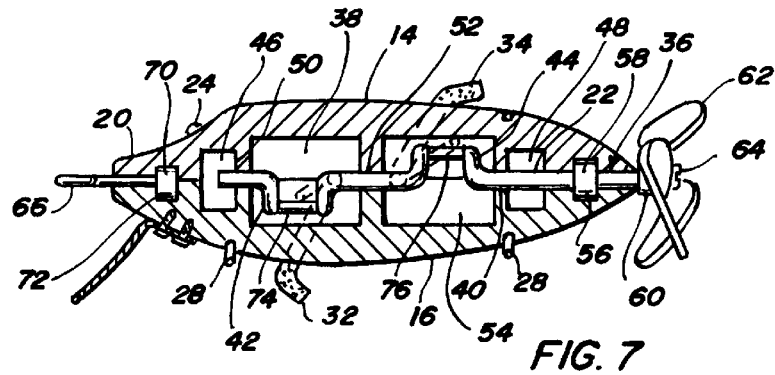
FIG. 7 is a side view in cross section of the plug taken along line 7—7 in FIG. 5.

Referring to the drawings more particularly by reference character, reference numeral 10 refers to a floating-and-diving fishing plug in accordance with the present invention. Plug 10 includes a buoyant body 12 with upper and lower sections 14, 16, respectively, interconnected with snap rings 18 accommodated within compatible grooves. Body 12 has front and rear opposed ends 20, 22, respectively for passage through the water front end first. Except for a simulated head portion 24, body 12 is substantially lengthwise symmetrical and snap rings 18 are interchangeable. As shown in the drawings, the grooves are circumferentially incomplete and the ends thereof are separated by a stop portion 26, which serves to ensure that the snap rings are correctly oriented. Each snap ring 18 includes a loop portion 28 suitable for accommodating a conventional hook 30. Plug 10 includes forward and rearward legs 32, 34 respectively, which are actuated into animated condition by means of a crank shaft generally shown by numeral 36 in FIGS. 6–8.

Upper and lower sections 14, 16 are generally similar and include a pair of forward and rearward cavities indicated by numerals 38 and 40, each cavity accommodating an associated crank portion 42, 44 of crank shaft 36. Smaller front and rear cavities 46, 48 flank cavities 38, 40, for increasing buoyancy. Crank shaft 36 is journal mounted within a compatible body groove, upper and lower portions of which are formed in upper and lower body sections 14, 16, respectively. The groove includes forward, intermediate and rearward axial portions accommodating compatible axially aligned shaft portions 50, 52 and 54. The crank shaft 36 is journal mounted within the groove, which includes a rearward enlarged recess 56 accommodating a crank shaft collar 58 at the rear end of body 12. Recess 56 and collar 58 facilitate the journal mounting and preclude longitudinal movement of shaft 36 relative to body 12. Remote rear end of shaft 36 includes an enlarged portion 60 to which a propeller 62 is mounted with a screw 64.

A pull element, generally indicated by numeral 66, is provided at front end 20 of body 12 to which may be attached a fishing line 68 so that plug 10 may be cast and pulled forward. Pull element 66 includes an enlarged portion 70, which is accommodated within an enlarged forward recess 72, independently of shaft 36 so that it does not rotate with the shaft.

Figure 8:
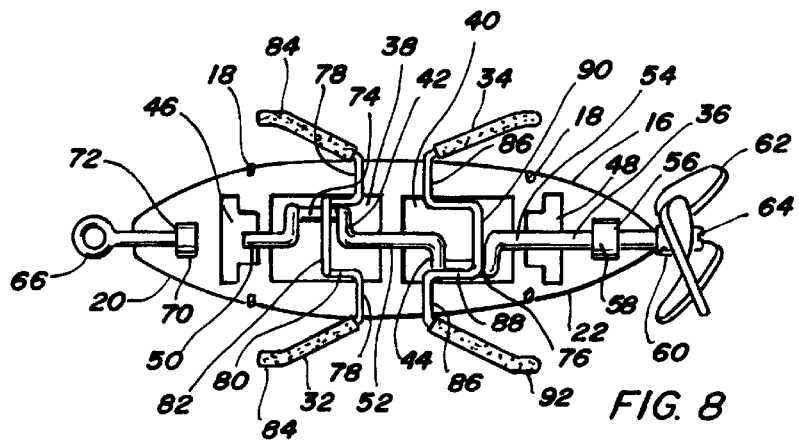
FIG. 8 is a plan view of a lower section of the plug.

Crank portions 42, 44 are substantially U-shaped and are angularly related to each other as shown in FIG. 8 being offset from one another for use as described below. Crank portions 42, 44 provide orbitable offset bight portions 74, 76, respectively engaging legs 32, 34, said legs constituting transverse shafts.

As best seen in FIG. 8, front leg 32 includes journal mounted portions 78 interconnected by a U-shaped crank portion 80. Crank portion 80 comprises an intermediate oscillatable, offset portion 82 between opposed axial portions 83. Opposed, outwardly extending end portions 84 are angularly related to the journal axis and bent into a downwardly depending configuration such that the end portions oscillate between positions that are below the journal axis. Intermediate offset portion 82 of front leg 32 is spaced from its associated journal axis a distance greater than the cranked orbiting portion 74 of shaft 36. The result of this is that as shaft 36 rotates, the intermediate offset portion 82 is raised by engagement with the associated crank shaft orbiting portion 74. The intermediate offset portion 82 can be moved upwardly from the longitudinal axis of rotation a distance greater than the engagement radius of crank shaft portion 42 and therefore there is no binding between said portions as shaft 36 rotates continuously. Because the center of gravity of leg 32 is offset from the journal axis in the same direction as intermediate offset portion 82, the intermediate portion is urged downwardly until again raised by shaft 36. End portion 84 of leg 32 moves up and down, below the journal axis, as shaft 36 rotates and oscillates the intermediate offset portion 82.

With continuing reference to FIG. 8, the structural arrangement of parts of rear leg 34 is substantially similar to that of the front leg and includes journal portions 86 interconnected by a crank portion 88 providing an intermediate offset portion 90. Crank portions of shaft 42, 44 are oppositely oriented, although not necessarily at 180° to each other, and move the legs up and down in opposite directions, the timing being controlled by the angle of offset. Because crank shaft portion 88 is oppositely disposed to crank shaft portion 80 orbiting crank shaft portion 76 produces oscillating motion of end portion 92 in the reverse direction to that of end portion 84 of front leg 32. Water flowing over the plug does not interfere with the oscillation of end portion 92 because it is angled in the direction of the water flow, therefore it may oscillate between positions above and below the journal axis.

Floating-and-diving plug 10 has a downwardly and forwardly directed lip 94 on front end 20 of lower section 16 which will cause the plug to plane below the surface of the water, at a depth determined by the angle and shape of the lip, the distance of the angler's cast and the speed at which the plug is retrieved.

Figure 9:
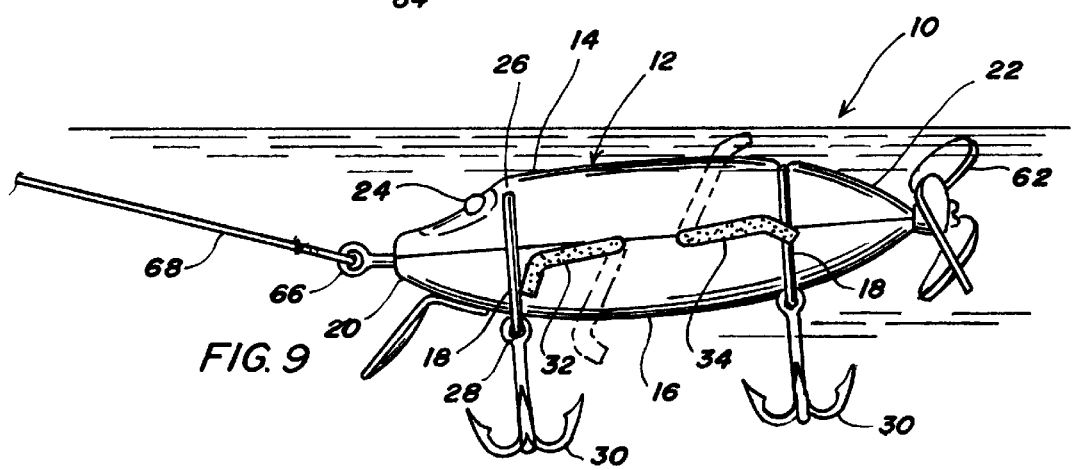
FIG. 9 is a side view of the plug planing under water, illustrating the legs in the first extreme position in full lines and in the second extreme position in broken lines.

In use, when plug 10 is cast, it floats because it is buoyant. As the plug is reeled slowly, propeller 62 turns and end portions 84, 92 of front and rear legs 32, 34, respectively, oscillate creating a surface disturbance. As shown in FIG. 9, when the plug is reeled more quickly, lip 94 causes it to dive. The legs are lifted by engagement with the associated orbiting portion of crank shaft 74, 76 until top dead center is reached following which the legs tend to fall under gravity. It is not necessary to assist this downward movement. Front legs continue to oscillate when the plug is submerged without front legs 32 being pinned by the flow of water over the plug.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A floating-and-diving fishing plug comprising
   (a) a buoyant body with upper and lower sections and front and rear opposed ends for passage through the water front end first,
   (b) a downwardly and forwardly directed lip at the front end of the lower section for pulling the plug under the water,
   (c) a longitudinal shaft mounted in journal relation to the body for rotation about a longitudinal journal axis and including:
      (1) an axial portion rotatable about the longitudinal journal axis, and
      (2) an orbitable portion disposed within the body in offset relation to said journal axis and orbital about said longitudinal journal axis,
   (d) a propeller attached to said axial portion and operatively rotating the longitudinal shaft, and
   (e) first and second transverse shafts mounted in journal relation to the upper and lower sections of the body for rotation about a first and a second transverse journal axis, said first and second transverse journal axes being generally coplanar with the longitudinal journal axis, said first shaft being nearer the front end of the body and said second shaft being nearer the rear end of the body, each of said transverse shafts including:
      (1) opposed axial portions rotatable about the transverse journal axis,
      (2) an intermediate oscillatable portion disposed within the body between said opposed axial portions in offset relation to said transverse journal axis and engaging under gravity the orbitable portion of the longitudinal shaft for oscillation about the transverse journal axis, the oscillatable portion being spaced from the longitudinal journal axis a distance greater than the orbital radius of the orbitable portion of the longitudinal shaft to preclude interference,
      (3) opposed end portions extending outwardly of the body in angular relation to the transverse journal axis, and
      (4) a center of gravity offset from the transverse journal axis in the same direction as the oscillatable portion whereby the oscillatable portion is urged downwardly under gravity until raised by the orbitable portion of the longitudinal shaft, said end portions of the first shaft angled towards the front end of the body and oscillating between positions that are below the transverse journal axis and said end portions of the second shaft angled towards the rear end of the body, whereby the end portions and the propeller create a surface disturbance when the plug is pulled slowly enough that it does not dive and whereby the end portions and the propeller create an underwater disturbance when the plug is pulled fast enough so that it dives.

2. The floating-and-diving fishing plug of claim 1 in which:

(f) the body includes separable upper and lower portions, and (g) the transverse shaft is mounted between said portions and the oscillatable portion is disposed above said orbitable portion to facilitate lifting removal of and subsequent replacement of the transverse shaft without disturbing the longitudinal shaft.

3. The floating-and-diving fishing plug of claim 1 in which:

(f) the body includes separable upper and lower portions, (g) snap rings hold the body portions together, and (h) a hook is connected to each removable snap ring.

\* \* \* \* \*